(12) United States Patent
Lin et al.

(10) Patent No.: US 8,884,878 B2
(45) Date of Patent: Nov. 11, 2014

(54) MOUSE WITH SWITCH DEVICE AND SWITCH DEVICE THEREOF

(75) Inventors: Yin Yu Lin, New Taipei (TW); Shu I Chen, New Taipei (TW)

(73) Assignee: Giga-Byte Technology Co., Ltd., New Taipei (TW)

( * ) Notice: Subject to any disclaimer, the term of this patent is extended or adjusted under 35 U.S.C. 154(b) by 503 days.

(21) Appl. No.: 13/280,271

(22) Filed: Oct. 24, 2011

(65) Prior Publication Data

US 2012/0319953 A1 Dec. 20, 2012

(30) Foreign Application Priority Data

Jun. 15, 2011 (TW) .............................. 100120796 A

(51) Int. Cl.
*G09G 5/08* (2006.01)
(52) U.S. Cl.
USPC .......................................... 345/163; 345/211
(58) Field of Classification Search
USPC .................... 345/163, 211; 455/522
See application file for complete search history.

(56) References Cited

U.S. PATENT DOCUMENTS 6,909,421 B2  6/2005  Wang
2004/0203984 A1* 10/2004  Yang .............................. 455/522

FOREIGN PATENT DOCUMENTS

| JP | H07-327323 A | 12/1995 |
|---|---|---|
| JP | H08-33216 A | 2/1996 |
| JP | U3090068 | 9/2002 |
| JP | U3108965 | 3/2005 |
| TW | 201101123 A1 | 1/2011 |
| TW | 201103220 A1 | 1/2011 |

* cited by examiner

*Primary Examiner* — Premal Patel
(74) *Attorney, Agent, or Firm* — Chun-Ming Shih

(57) ABSTRACT

A switch device includes a positive power terminal, a negative power terminal, a plurality of battery slots and a change-over switch. Each battery slot has a positive battery terminal and a negative battery terminal. The positive battery terminal of a battery slot electrically connects to the positive power terminal. The negative battery terminal of another battery slot electrically connects to the negative power terminal. The change-over switch electrically connects with the positive power terminal, the negative power terminal, the negative battery terminal of the battery slot which electrically connecting to the positive power terminal, and the positive battery terminal of the battery slot which electrically connecting to the negative power terminal. The change-over switch is toggled to connect the battery slots as a parallel connection or a series connection optionally.

3 Claims, 5 Drawing Sheets

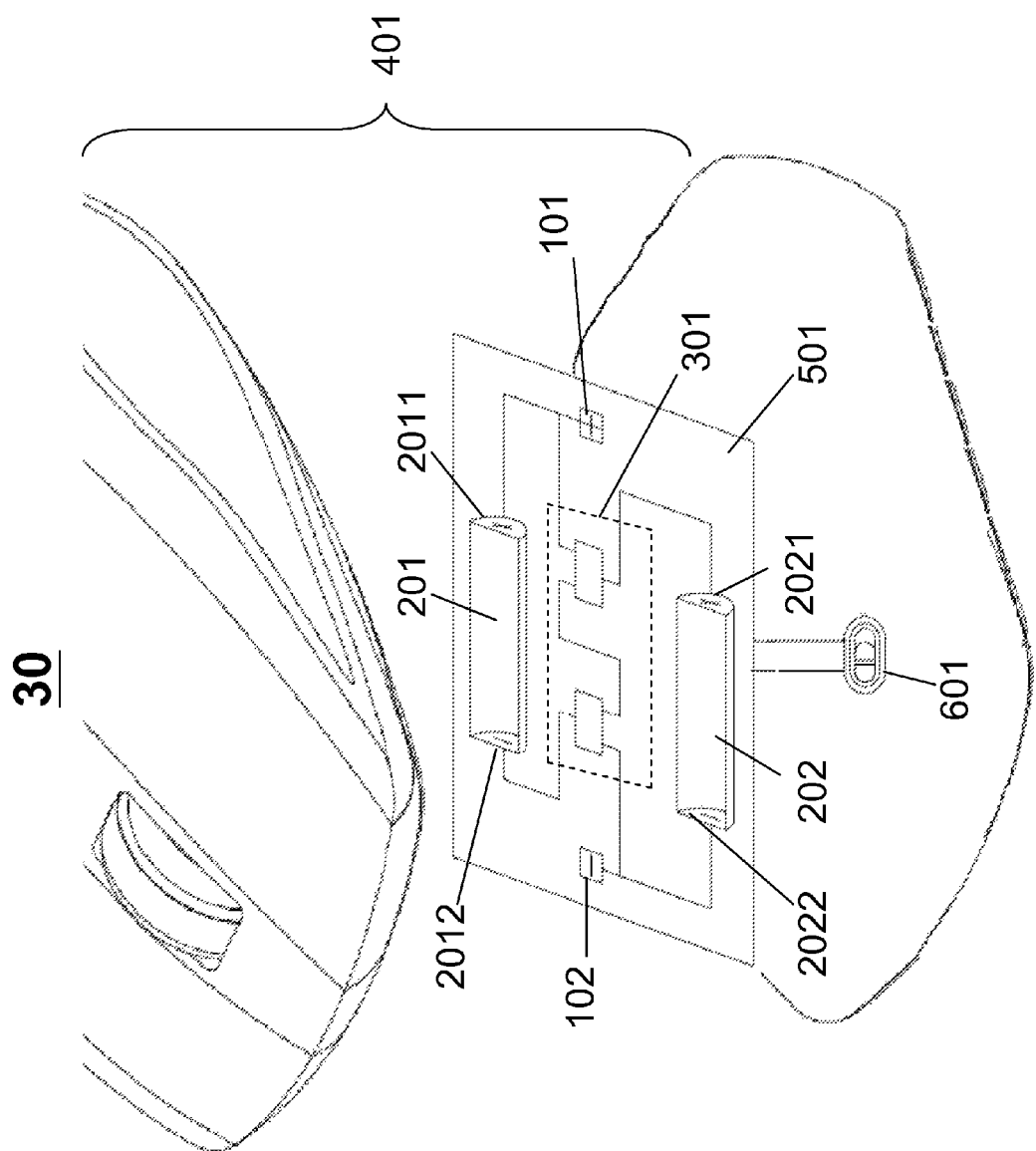

MOUSE WITH SWITCH DEVICE AND SWITCH DEVICE THEREOF

This application claims the benefit of the filing date of Taiwan Patent Application No. 100120796, filed on 2011 Jun. 15, in the Taiwan Intellectual Property Office, the disclosure of which is incorporated herein in its entirety by reference.

BACKGROUND OF THE INVENTION

1. Field of Invention

The present invention relates to a mouse and a switching device, in particular, relates to a mouse and a switching device that switches between a parallel connection and a series connection of the batteries.

2. Related Art

A mouse is one of the main input and control devices of the present computer system. The function and the structure of the mouse have been improved and expanded with the progress of the technique. For example, the mouse connected to the computer simply by a cable in early days, and the wireless communication techniques are more and more prevalent later, the applications for the wireless mouse are gradually available, which connect to the computer through the wireless communication, for instance, the Bluetooth technology.

The cable mouse connects to the computer system physically so that the required power of the mouse, for instance, the power consumed by the optical sensor of an optical mouse is always provided by the computer system via the cable. However, the wireless mouse has no direct connection with the computer, its demanding power, aside from the power for its own mouse features, includes extra power for the additional wireless devices and other functions, where the demanding power is provided by the battery devices or battery modules carried by the mouse.

For the mice with battery loaded nowadays, restricted by the limited space and specific function of the mice, a single type of either parallel connection or series connection is the design for its battery power supply. For example, the parallel connection is always adopted to extend the life of the battery; while the series connection provides higher power to enhance and support the function of the mouse.

Unfortunately, such single type of the power supply limits the efficiency and adjustability of the mouse; meanwhile, it also restricts the efficiency of the battery because of the specific function of the mouse.

SUMMARY OF THE INVENTION

Accordingly, the present invention provides a mouse with a switching device of a battery for parallel and series connections and the switching device thereof, to solve the limitations of the power supply and the design of the mouse, and the problems of the inefficiency of the batteries and the like.

The present invention discloses a switching device which includes a positive power terminal, a negative power terminal, a plurality of battery slots and a change-over switch. The battery slots each includes a positive battery terminal and a negative battery terminal, wherein the positive battery terminal of one battery slot electrically connects to the positive power terminal, and the negative battery terminal of the other one battery slot electrically connects to the negative power terminal.

The change-over switch electrically connects with the positive power terminal, the negative power terminal, the negative battery terminal of the battery slot whose positive battery terminal electrically connecting to the positive power terminal, and the positive battery terminal of the battery slot whose negative battery terminal electrically connecting to the negative power terminal.

In a first mode, the change-over switch is triggered to connect the negative power terminal with the negative battery terminal of the battery slot whose positive battery terminal electrically connecting to the positive power terminal, and the change-over switch is triggered to connect the positive power terminal with the positive battery terminal of the battery slot whose negative battery terminal electrically connecting to the negative power terminal, to form a parallel connection.

In a second mode of series connection, the change-over switch is triggered to connect the negative battery terminal of the battery slot whose positive battery terminal electrically connecting to the positive power terminal with the positive battery terminal of the battery slot whose negative battery terminal electrically connecting to the negative power terminal, to form a series connection.

The mouse of the present invention features the switching of the battery between the parallel and the series connections. The mouse includes a housing, a circuit board, a positive power terminal, a negative power terminal, a plurality of battery slots, a change-over switch and a toggle switch.

The circuit board is disposed in the housing, and the positive power terminal, the negative power terminal, the battery slots, and the change-over switch electrically connect with the circuit board. The battery slots each includes a positive battery terminal and a negative battery terminal, wherein the positive battery terminal of one battery slot electrically connects to the positive power terminal and the negative battery terminal of the other one battery slot electrically connects to the negative power terminal.

The change-over switch electrically connects to the positive power terminal, the negative power terminal, the negative battery terminal of the battery slot whose positive battery terminal electrically connecting to the positive power terminal and the positive battery terminal of the battery slot whose positive battery terminal electrically connecting to the negative power terminal. The toggle switch is disposed on the housing and connects to the change-over switch, wherein the toggle switch selectively triggers the switching of the change-over switch.

The switching device of the mouse of the present invention switches the connection of the batteries between the parallel connection and the series connection freely. The mouse of the present invention switches the power mode flexibly according to the requirement of the application and improves the efficiency of the batteries.

The present invention features, differentiating from the single-battery power supply of the prior mice, the design of an intermediate switch device, which enables the connection of batteries in the mouse to switch freely between the parallel and the series connections, and empowers the mouse to switch flexibly to the power mode correspondent with the demand of use.

Further objects, embodiments and advantages are apparent in the drawings and in the detailed description which follows.

BRIEF DESCRIPTION OF THE DRAWINGS

FIG. 5 illustrates the mouse of one embodiment of the present invention.

DETAIL DESCRIPTION OF THE INVENTION

Figure 1:
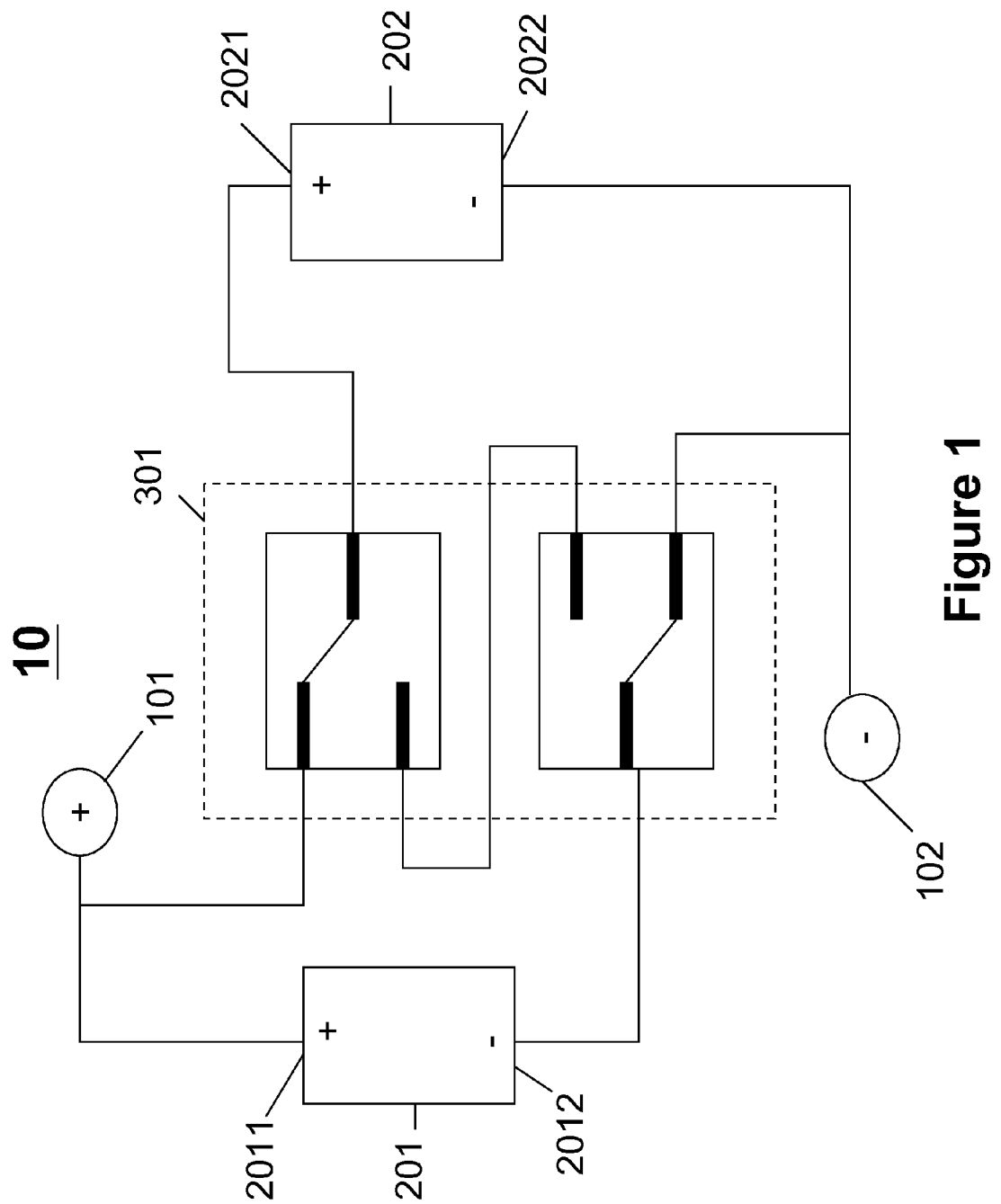
FIG. 1 illustrates the parallel connection of the switch device of one embodiment of the present invention.
Figure 2:
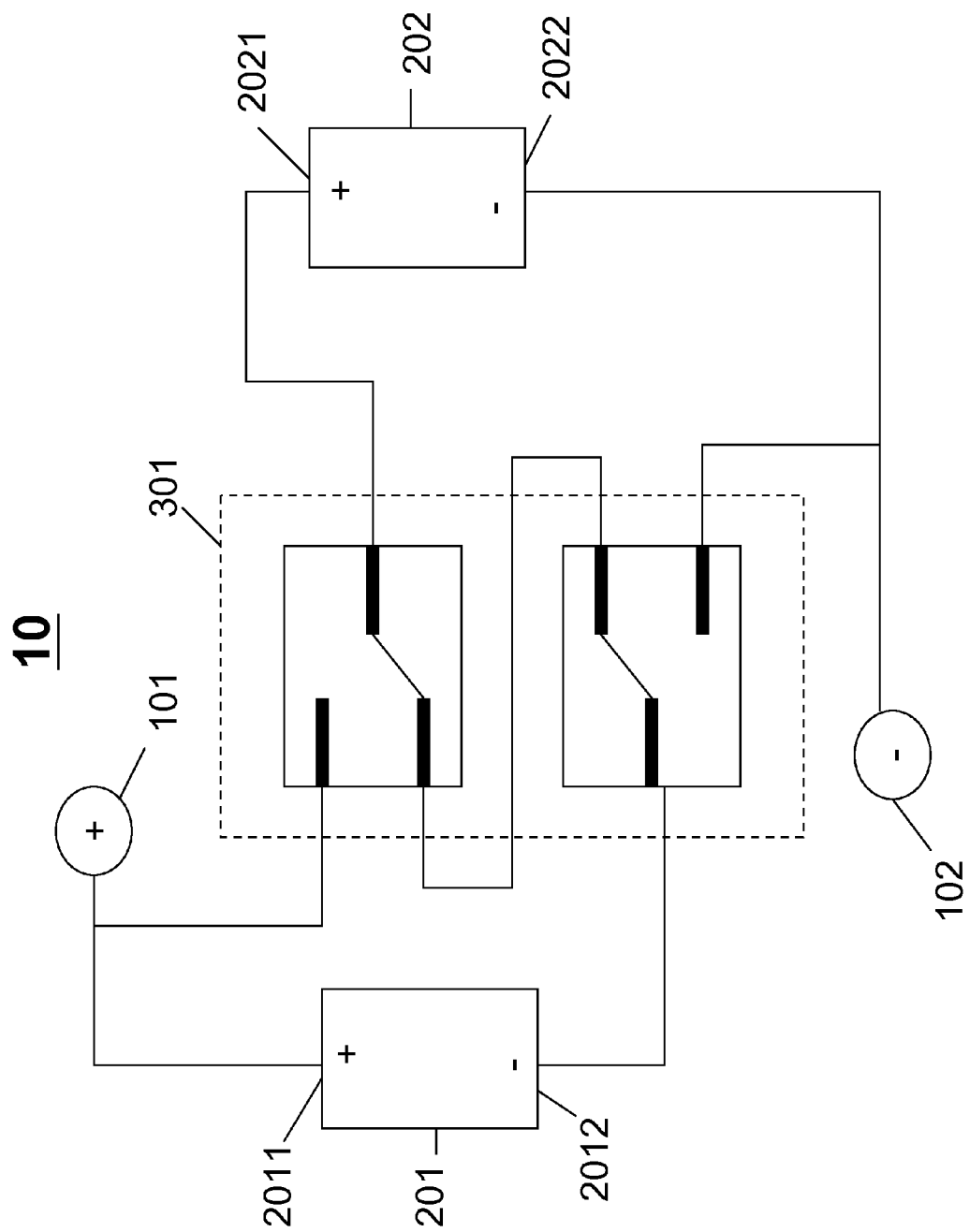
FIG. 2 illustrates the series connection of the switch device of one embodiment of the present invention.

FIG. 1 and FIG. 2 illustrate the switching device of the first embodiment of the present invention.

Referring to FIG. 1 and FIG. 2, the switch device 10 includes a positive power terminal 101, a negative power terminal 102, battery slots 201 and 202, and a change-over switch 301. The battery slot 201 includes a positive battery terminal 2011 and a negative battery terminal 2012; the battery slot 202 includes a positive battery terminal 2021 and a negative battery terminal 2022. The positive battery terminal 2011 of the battery slot 201 electrically connects to the positive power terminal 101, and the negative battery terminal 2022 of the battery slot 202 electrically connects to the negative power terminal 102. The change-over switch 301 electrically connects to the positive power terminal 101, the negative power terminal 102, the negative battery terminal 2012 and the positive battery terminal 2021.

Referring to FIG. 1, the change-over switch 301 is triggered to optionally connect the negative power terminal 102 with the negative battery terminal 2012, and the change-over switch 301 is triggered to connect the positive power terminal 101 with the positive battery terminal 2021. The FIG. 1 illustrates the parallel connection of the switch device of one embodiment of the present invention.

Referring to FIG. 2, the change-over switch 301 is triggered to optionally connect the negative battery terminal 2012 with the positive battery terminal 2021. FIG. 2 illustrates the series connection of the switch device of one embodiment of the present invention.

The type of the change-over switch 301 is not limited to the present embodiment. The present embodiment utilizes two sets of the Single Pole Double Throw (SPDT) switch as the change-over switch 301 for the purpose of easy description. However, the type of the change-over switch 301 is not limited to those described therein. The change-over switch 301 could be a mechanical switch or an electrical switch, and the way of switching the connection also could be carried out by the Multiple Pole Multiple Throw (MPMT) switch. The present embodiment takes advantage of the combination of the SPDT switches for description simply. It will be understood that various types of the change-over switch 301 will occur to those skilled in the art, the present invention is not limited to these embodiments, but variations and modifications may be made without departing from the scope of the present invention.

Figure 3:
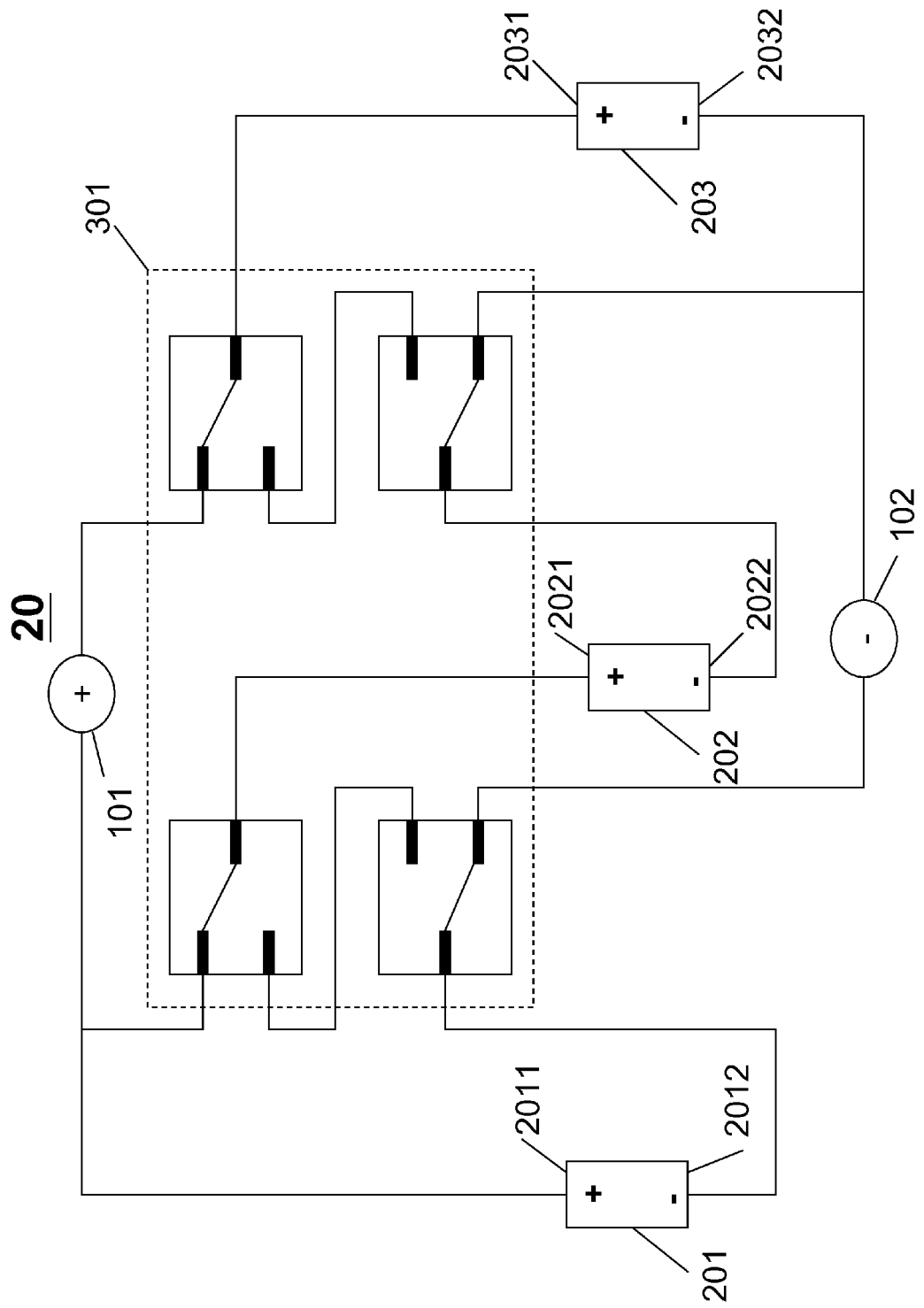
FIG. 3 illustrates the parallel connection of the switch device of other one embodiment of the present invention.
Figure 4:
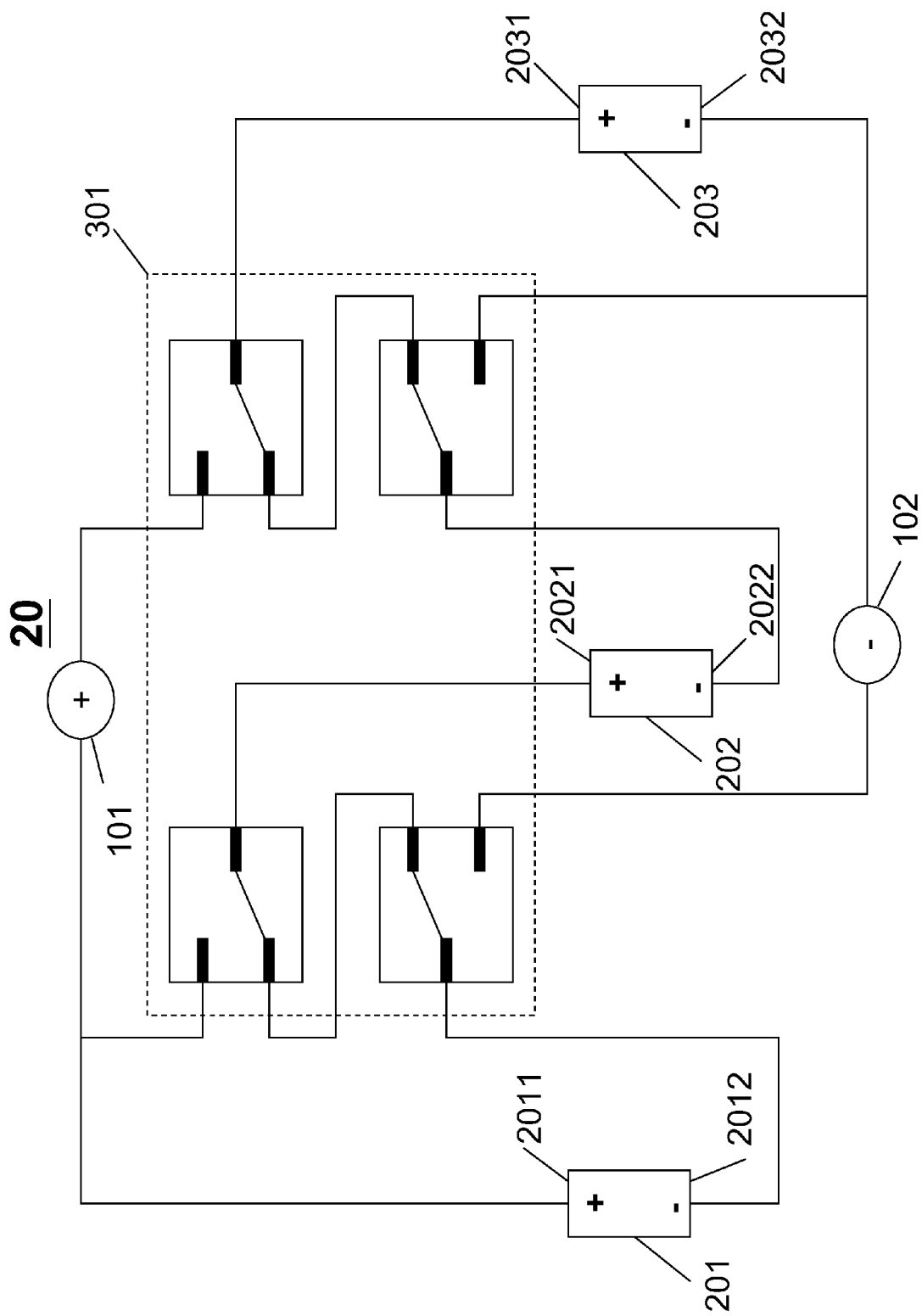
FIG. 4 illustrates the series connection of the switch device of other one embodiment of the present invention.

FIG. 3 and FIG. 4 illustrate the switching device 20 of the second embodiment of the present invention.

Referring to FIG. 3 and FIG. 4, the switching device 20 includes a positive power terminal 101, a negative power terminal 102, a plurality of battery slots 201, 202 and 203, and a change-over switch 301.

This embodiment is described with three battery slots, however, the quantity of the battery slot is not limited to this embodiment. It will be understood that various quantity of the battery slots will occur to those skilled in the art, the present invention is not limited to these embodiments, but variations and modifications may be made without departing from the scope of the present invention.

The battery slot 201 includes a positive battery terminal 2011 and a negative battery terminal 2012; the battery slot 202 includes a positive battery terminal 2021 and a negative battery terminal 2022; the battery slot 203 includes a positive battery terminal 2031 and a negative battery terminal 2032. The positive battery terminal 2011 of the battery slot 201 electrically connects to the positive power terminal 101, and the negative battery terminal 2032 of the battery slot 203 electrically connects to the negative power terminal 102. The change-over switch 301 electrically connects with the positive power terminal 101, the negative power terminal 102, the positive battery terminals except for the positive battery terminal 2011, and the negative battery terminals except for the negative battery terminal 2032.

Referring to FIG. 3, the change-over switch 301 is triggered to optionally connect the negative battery terminal 2012 with the negative power terminal 102, connect the positive battery terminal 2021 with the positive power terminal 101, connect the negative battery terminal 2022 with the negative power terminal 102, and connect the positive battery terminal 2031 with the positive power terminal 101. FIG. 3 illustrates the parallel connection of the switching device of other one embodiment of the present invention.

Referring to FIG. 4, the change-over switch 301 is triggered to optionally connect the negative battery terminal 2012 with the positive battery terminal 2021, and connect the positive battery terminal 2031 with the negative battery terminal 2022. FIG. 4 illustrates the series connection of the switching device of other one embodiment of the present invention.

The type of the battery slot is not limited to the present embodiment. The present embodiment utilizes the general battery slot for the purpose of easy description. However, the type of the battery slot is not limited to those described therein. It will be understood that various types of the battery slot will occur to those skilled in the art, the present invention is not limited to these embodiments, but variations and modifications may be made without departing from the scope of the present invention.

FIG. 5 illustrates a mouse 30 of one embodiment of the present invention. The mouse 30 of the present invention includes a housing 401, a circuit board 501, a positive power terminal 101, a negative power terminal 102, two battery slots 201 and 202, a change-over switch 301, and a toggle switch 601.

The circuit board 501 is disposed in the housing 401, and the circuit board 501 electrically connects with the positive power terminal 101, the negative power terminal 102, and the battery slots. The battery slot 201 includes a positive battery terminal 2011 and a negative battery terminal 2012; the battery slot 202 includes a positive battery terminal 2021 and a negative battery terminal 2022. The positive battery terminal 2011 of the battery slot 201 electrically connects to the positive power terminal 101, and the negative battery terminal 2022 of the battery slot 202 electrically connects to the negative power terminal 102.

The change-over switch 301 electrically connects to the circuit board 501, the positive power terminal 101, the negative power terminal 102, the negative battery terminal 2012 and the positive battery terminal 2021. The toggle switch 601 is disposed on the housing 401 and connects to the change-over switch 301. The toggle switch 601 optionally triggers the change-over switch 301.

The change-over switch 301 is triggered by the toggle switch 601 to optionally connect the negative battery terminal 2012 with the negative power terminal 102, and the change-over switch 301 is triggered by the toggle switch 601 to optionally connect the positive battery terminal 2021 with the positive power terminal 101. As the result, the connection of the batteries of the mouse 30 is the parallel connection.

The change-over switch 301 is triggered by the toggle switch 601 to optionally connect the negative battery terminal 2012 with the positive battery terminal 2021. As the result, the connection of the batteries of the mouse 30 is the series connection.

The mouse with the switching device and the switching device thereof of the present invention are applicable to the mouse or the other apparatus with the battery power supply. User could trigger the toggle switch directly to switch the connection of the batteries. The present invention enhances the flexibility of various applications and also improves the efficiency of the batteries.

For example, user could select the parallel connection to extend the life of the batteries at first. The power of the battery is decreased after operation, and then user could switch the connection of the batteries from the parallel connection to the series connection. The series connection combines the remaining power of the batteries to extend the lifetime of the batteries. The present invention exerts the power of the batteries more fully and reduces the waste.

In the other application, user still selects the parallel connection for longer operation. However, if other application or function of the mouse is launched and more power is required, user could switch the connection type to the series connection to provide more power to support the other function, like LED or wireless, of the mouse. The mouse of the present invention is fit for various designs of the mouse and diminishes the limitation of the power supply.

The mouse with the switching device and the switching device thereof could both provide the long and high power supply, in addition, the present invention further enlarges the application and the function of the mouse and exploits the batteries fully.

While the disclosure has been described in terms of what is presently consider to be the preferred embodiments, it is to be understood that the disclosure needs not be limited to the disclosed embodiment. On the contrary, it is intended cover various modifications and similar arrangements included within the spirit and scope of the appended claims which are to be accorded with the broadest interpretation so as to encompass all such modification and similar structures. It is therefore intended by the appended claims to define the true scope of the invention.

The invention claimed is:

1. A mouse comprising:
   a housing;
   a circuit board disposing in the housing;
   a positive power terminal electrically connecting to the circuit board;
   a negative power terminal electrically connecting to the circuit board;
   a plurality of battery slots electrically connecting to the circuit board, and the battery slots each comprising a positive battery terminal and a negative battery terminal, the positive battery terminal of one battery slot electrically connecting to the positive power terminal and the negative battery terminal of the another one battery slot electrically connects to the negative power terminal;
   a change-over switch electrically connecting to the circuit board, and the change-over switch electrically connecting to the positive power terminal, the negative power terminal, the negative battery terminal of the battery slot whose positive battery terminal electrically connecting to the positive power terminal and the positive battery terminal of the battery slot whose positive battery terminal electrically connecting to the negative power terminal; and
   a toggle switch disposing on the housing and connecting to the change-over switch, wherein the toggle switch optionally triggers the change-over switch;
   in a first mode, the change-over switch being triggered by the toggle switch to connect the negative power terminal with the negative battery terminal of the battery slot whose positive battery terminal electrically connecting to the positive power terminal, and the change-over switch being triggered by the toggle switch to connect the positive power terminal with the positive battery terminal of the battery slot whose negative battery terminal electrically connecting to the negative power terminal, and forming a parallel connection;
   in the second mode, the change-over switch being triggered by the toggle switch to connect the negative battery terminal of the battery slot whose positive battery terminal electrically connecting to the positive power terminal with the positive battery terminal of the battery slot whose negative battery terminal electrically connecting to the negative power terminal, and forming a series connection.

2. The mouse as claim 1, wherein the change-over switch electrically connects to the positive power terminal, the negative power terminal, the positive battery terminals of the battery slots without a connection to the positive power terminal, and the negative battery terminals of
   the battery slots without a connection to the negative power terminal;
   in the first mode, the change-over switch being triggered to connect the negative power terminal with the negative battery terminals of the battery slots without a connection to the negative power terminal, and the change-over switch being triggered to connect the positive power terminal with the positive battery terminals of the battery slots without a connection to the positive power terminal, to form a parallel connection;
   in the second mode, the change-over switch being triggered to connect the positive battery terminals of the battery slots without a connection to the positive power terminal with the negative battery terminals of the battery slots without a connection to the negative power terminal, to form a series connection.

3. The mouse as claim 1, wherein the change-over switch is a mechanical switch or an electrical switch.

* * * * *